US012776319B2

(12) United States Patent
Yeo et al.

(10) Patent No.: US 12,776,319 B2
(45) Date of Patent: Oct. 27, 2026

(54) SYSTEM AND METHOD FOR ARTIFICIAL INTELLIGENCE AGENT CONSIDERING USER'S GAZE

(71) Applicant: Samsung Electronics Co., Ltd., Suwon-si (KR)

(72) Inventors: Jaeyung Yeo, Suwon-si (KR); Taegu Kim, Suwon-si (KR); Gajin Song, Suwon-si (KR); Hoseon Shin, Suwon-si (KR); Eunkyung Lee, Suwon-si (KR); Hyeoncheon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 18/823,365

(22) Filed: Sep. 3, 2024

(65) Prior Publication Data

US 2025/0029606 A1 Jan. 23, 2025

Related U.S. Application Data

(63) Continuation of application No. PCT/KR2024/006598, filed on May 14, 2024.

(30) Foreign Application Priority Data

Jul. 21, 2023 (KR) ........................ 10-2023-0095507
Aug. 16, 2023 (KR) ........................ 10-2023-0107145

(51) Int. Cl.
*G10L 15/22* (2006.01)
*G06F 3/01* (2006.01)

(52) U.S. Cl.
CPC .............. *G10L 15/22* (2013.01); *G06F 3/013* (2013.01)

(58) Field of Classification Search
CPC ...................................................... G10L 15/22
See application file for complete search history.

(56) References Cited

U.S. PATENT DOCUMENTS 11,056,108 B2 7/2021 Wu et al.
11,221,669 B2 1/2022 White et al.
11,403,821 B2 8/2022 Bar-zeev et al.
(Continued)

FOREIGN PATENT DOCUMENTS

KR 10-2015-0138109 12/2015
KR 20150138109 A 12/2015
(Continued)

OTHER PUBLICATIONS

Search Report and Written Opinion dated Aug. 13, 2024 issued in International Patent Application No. PCT/KR2024/006598.
(Continued)

*Primary Examiner* — Douglas Godbold
(74) *Attorney, Agent, or Firm* — Nixon & Vanderhye P.C.

(57) ABSTRACT

The present disclosure relates to a method of operating an artificial intelligence (AI) agent considering a gaze and the method includes: setting a position of a virtual object, outputting the virtual object, obtaining gaze information of a user, determining whether an activation condition of the virtual object is satisfied by considering the gaze information of the user, and based on the activation condition of the virtual object being satisfied as a result of determination, processing an utterance of the user without a wake word.

18 Claims, 12 Drawing Sheets

(56) References Cited

U.S. PATENT DOCUMENTS

| | | | | |
|---|---|---|---|---|
| 11,514,673 | B2 | 11/2022 | Lehrich et al. | |
| 11,615,598 | B2 | 3/2023 | Whitney et al. | |
| 12,073,017 | B2 * | 8/2024 | Lee | G02B 27/0093 |
| 2015/0348548 | A1 | 12/2015 | Piernot et al. | |
| 2019/0139547 | A1 | 5/2019 | Wu et al. | |
| 2019/0156818 | A1 | 5/2019 | Piersol et al. | |
| 2019/0187787 | A1 | 6/2019 | White et al. | |
| 2019/0295544 | A1 * | 9/2019 | Garcia | G10L 15/08 |
| 2020/0098188 | A1 | 3/2020 | Bar-zeev et al. | |
| 2020/0202849 | A1 * | 6/2020 | Cartwright | G10L 15/1815 |
| 2020/0219501 | A1 * | 7/2020 | Cartwright | G06F 3/0346 |
| 2021/0097286 | A1 | 4/2021 | Lehrich et al. | |
| 2021/0104100 | A1 * | 4/2021 | Whitney | G06T 13/40 |
| 2022/0108535 | A1 | 4/2022 | Whitney et al. | |
| 2022/0121275 | A1 * | 4/2022 | Balaji | G06V 20/20 |
| 2022/0215630 | A1 * | 7/2022 | Solanki | G06T 19/00 |
| 2023/0026511 | A1 | 1/2023 | Qiao et al. | |
| 2023/0128422 | A1 * | 4/2023 | Li | G10L 15/24<br>345/156 |
| 2023/0152886 | A1 | 5/2023 | Sztuk et al. | |
| 2023/0315385 | A1 * | 10/2023 | Akmal | G10L 15/26<br>715/727 |
| 2024/0347056 | A1 * | 10/2024 | Zheng | G10L 15/22 |

FOREIGN PATENT DOCUMENTS

| | | | |
|---|---|---|---|
| KR | 10-2022-0140026 | | 10/2022 |
| KR | 20220140026 | A | 10/2022 |
| WO | 2022/093401 | | 5/2022 |
| WO | 2022093401 | A1 | 5/2022 |

OTHER PUBLICATIONS

International Search Report for PCT/KR2024/006598 mailed Aug. 13, 2024, 3 pages.

Written Opinion of the ISA for PCT/KR2024/006598 mailed Aug. 13, 2024, 5 pages.

* cited by examiner

SYSTEM AND METHOD FOR ARTIFICIAL INTELLIGENCE AGENT CONSIDERING USER'S GAZE

CROSS-REFERENCE TO RELATED APPLICATIONS

This application is continuation of International Application No. PCT/KR2024/006598 designating the United States, filed on May 14, 2024, in the Korean Intellectual Property Receiving Office and claiming priority to Korean Patent Application No. 10-2023-0095507, filed on Jul. 21, 2023, and Korean Patent Application No. 10-2023-0107145, filed on Aug. 16, 2023, in the Korean Intellectual Property Office, the disclosures of each of which are incorporated by reference herein in their entireties.

BACKGROUND

1. Field

The disclosure relates to an artificial intelligence system and method considering a gaze of a user in an extended reality (XR) device.

2. Description of Related Art

Currently, most systems operating a voice assistant may operate a system in which a user utters a wake word before an actual command utterance and then the user utters an actual command to the voice assistant. For example, in the phrase "Hi Bixby, how's the weather today?", the part "Hi Bixby" may be a wake word to initiate an input to the voice assistant rather than an actual command part.

An interaction using the wake word may be omitted in a conversation with a real person. However, in the system, since the wake word is required to be uttered, a user may feel the contrivance.

Accordingly, various prior arts may exist to address the inconvenience of users using the wake word.

For example, when a user says the wake word during the conversation, the conversation of the user may be cropped front and back and a corresponding sentence may be transmitted to a server to classify intent of the user. Alternatively, a microphone may be maintained in an on-state without a wake word and the utterance of the user may be collected, and then a system may determine intent of the user based thereon.

However, the existing techniques may require a continuous input of system resources to analyze the utterance of the user. For example, an automatic speech recognition (ASR) module and a natural language understanding (NLU) module may need to perform operations to analyze a conversation of the user, and execution of these modules for a voice assistant that is discontinuously used may require continuous consumption of system resources. In addition, a personal privacy infringement problem may occur because not only utterance parts of voice data of the user for commands but also unnecessary parts thereof are collected as data for analysis in addition to the system efficiency problem.

The above information may be presented as the related art to help with the understanding of the disclosure. No assertions are made as to whether any of the above is applicable as a prior art related to the disclosure.

SUMMARY

Embodiments of the disclosure provide an artificial intelligence (AI) agent system and method considering a gaze of a user.

According to an example embodiment, a method of operating an AI agent considering a gaze, includes: setting a position of a virtual object, outputting the virtual object, obtaining gaze information of a user, determining whether an activation condition of the virtual object is satisfied by considering the gaze information of the user, and based on the activation condition of the virtual object being satisfied as a result of determination, processing an utterance without a wake word.

The determining of whether the activation condition of the virtual object is satisfied by considering the gaze information of the user includes determining that the activation condition of the virtual object is satisfied based on the gazing at the virtual object by considering the gaze information of the user and the position of the virtual object.

The method further includes determining a position of a user, and wherein the setting of the position of the virtual object includes setting the position of the virtual object by considering the position of the user.

The method further includes determining a position of the user, and analyzing an area where the user is positioned using an image input by a camera, and wherein the setting of the position of the virtual object includes setting the position of the virtual object considering the position of the user and information about the analyzed area.

The method further includes determining a position of the user, and wherein the determining whether the activation condition of the virtual object is satisfied by considering the gaze information of the user includes determining that the activation condition of the virtual object is satisfied based on the user being within a specified distance from the virtual object and the user gazing at the virtual object by considering the gaze information, the position of the user, and the position of the virtual object.

The setting of the position of the virtual object further includes setting a field of view (FOV) of the virtual object with the position of the virtual object, the outputting of the virtual object includes, based on outputting the virtual object, outputting the virtual object by displaying the FOV of the virtual object or an eye of the virtual object, and the determining whether the activation condition of the virtual object is satisfied by considering the gaze information of the user includes determining that the activation condition of the virtual object is satisfied based on the user and the virtual object gazing at each other by considering the gaze information of the user, the position of the virtual object, and the FOV of the virtual object.

The method further includes determining a position of the user, wherein the setting of the position of the virtual object further includes setting the FOV of the virtual object with the position of the virtual object, the outputting of the virtual object includes, based on outputting the virtual object, outputting the virtual object by displaying the FOV of the virtual object or an eye of the virtual object, and the determining whether the activation condition of the virtual object is satisfied by considering the gaze information of the user includes determining that the activation condition of the virtual object is satisfied based pm the user being within a specified distance from the virtual object and the user and the virtual object gazing at each other by considering the gaze information, the position of the virtual object, and the FOV of the virtual object.

The method further includes, based on the wake word being input while the activation condition of the virtual object is not satisfied as a result of determination, adjusting the virtual object to satisfy the activation condition of the virtual object.

The outputting of the virtual object includes outputting the virtual object as a specified character and outputting the virtual object to act an action pattern of the specified character.

According to an example embodiment, an AI agent system considering a gaze includes: a first sensor configured to sense an eye of a user, a display unit including a display on which a virtual object is output, a virtual object setting unit comprising circuitry configured to set a position of the virtual object, a virtual object visualization unit comprising circuitry configured to output the virtual object on the display unit, a user sensing unit comprising circuitry configured to obtain gaze information of the user through the first sensor, a virtual object activation unit comprising circuitry configured to determine whether an activation condition of the virtual object is satisfied by considering the gaze information of the user, an utterance collection unit comprising circuitry configured to collect an utterance of the user without a wake word based on the activation condition of the virtual object being satisfied as a result of determination of the virtual object activation unit, and an utterance processing unit comprising circuitry configured to process the utterance of the user collected by the utterance collection unit.

The virtual object activation unit is further configured to determine that the activation condition of the virtual object is satisfied based on the user gazing at the virtual object by considering the gaze information of the user and the position of the virtual object.

The AI agent system further includes a second sensor configured to determine a position, wherein the user sensing unit is further configured to determine the position of the user through the second sensor, and the virtual object setting unit is further configured to set the position of the virtual object by considering the position of the user.

The AI agent system further includes the second sensor configured to determine a position, and a third sensor configured to collect an image in a direction in which the user gazes, wherein the user sensing unit is further configured to determine the position of the user through the second sensor and analyze an area where the user is positioned, and the virtual object visualization unit is further configured to set the position of the virtual object by considering the position of the user and information about the analyzed area.

The AI agent system further includes the second sensor configured to determine a position, wherein the user sensing unit is further configured to determine the position of the user through the second sensor, and the virtual object activation unit is further configured to determine that the activation condition of the virtual object is satisfied based on the user being within a specified distance from the virtual object and the user gazing at the virtual object by considering the gaze information of the user, the position of the user, and the position of the virtual object.

The virtual object visualization unit is further configured to set an FOV of the virtual object with the position of the virtual object and based on outputting the virtual object, output the virtual object by displaying the FOV of the virtual object or an eye of the virtual object, and the virtual object activation unit is further configured to determine that the activation condition of the virtual object is satisfied based on the user and the virtual object gazing at each other by considering the gaze information of the user, the position of the virtual object, and the FOV of the virtual object.

The AI agent system further includes the second sensor configured to determine a position, wherein the user sensing unit is further configured to determine the position of the user through the second sensor, the virtual object visualization unit is further configured to set an FOV of the virtual object with the position of the virtual object and based on outputting the virtual object, output the virtual object by displaying the FOV of the virtual object or the eye of the virtual object, and the virtual object activation unit is further configured to determine that the activation condition of the virtual object is satisfied based on the user being within a specified distance from the virtual object and the user and the virtual object gazing at each other by considering the gaze information of the user, the position of the virtual object, and the FOV of the virtual object.

The virtual object visualization unit is further configured to, based on the wake word being input through the utterance collection unit while the activation condition of the virtual object is not satisfied as a result of determination of the virtual object activation unit, adjust the virtual object to satisfy the activation condition of the virtual object.

The virtual object setting unit is further configured to set the virtual object as a specified character and set the virtual object to act an action pattern of the preset character.

According to an example embodiment, an AI agent system considering a gaze includes: a first sensor configured to sense an eye of a user, a display unit including a display on which a virtual object is output, and at least one processor, comprising processing circuitry, individually and/or collectively, configured to: set a position of the virtual object, output the virtual object on the display unit, obtain gaze information of the user through the first sensor, determine whether an activation condition of the virtual object is satisfied based on the gaze information of the user, and based on the activation condition of the virtual object being satisfied as a result of determination, process an utterance of the user without a wake word.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
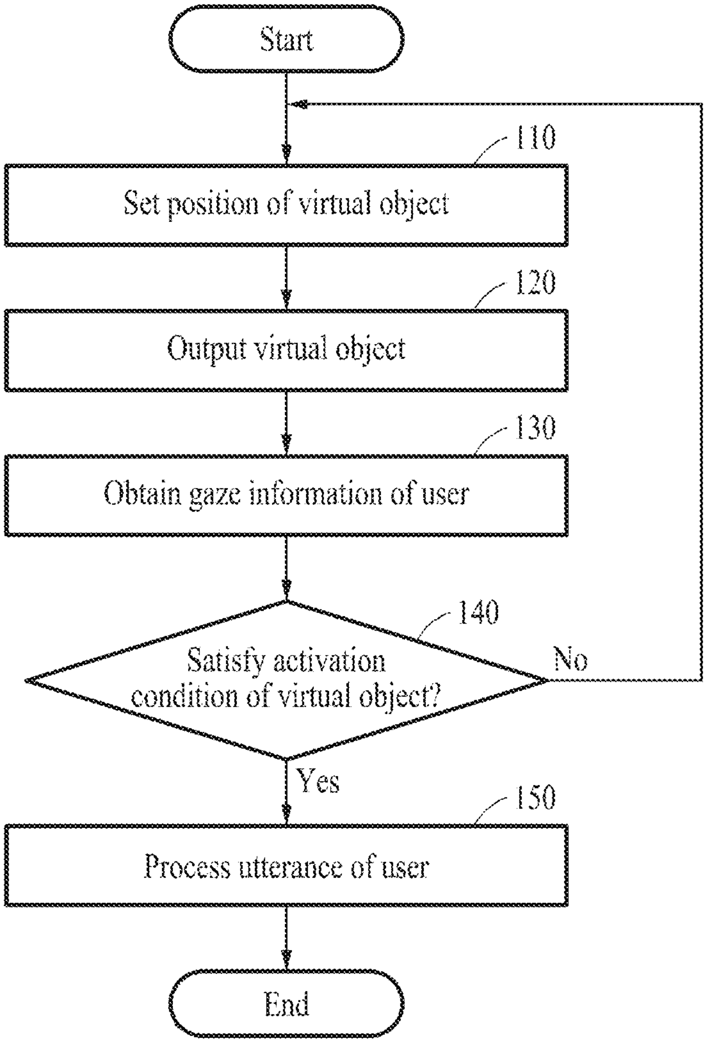
FIG. 1 is a flowchart illustrating an example process of operating an artificial intelligence (AI) agent by considering a gaze of a user in an AI agent system according to various embodiments.

Hereinafter, various example embodiments will be described in greater detail with reference to the accompanying drawings. However, various alterations and modifications may be made to the various embodiments. The embodiments are not intended to be limited by the descriptions of the present disclosure. The embodiments should be understood to include all changes, equivalents, and replacements within the idea and the technical scope of the disclosure.

The terminology used herein is for the purpose of describing various embodiments only and is not to be limiting of the various embodiments. As used herein, the singular forms "a", "an", and "the" include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like elements and a repeated description related thereto may be omitted. In the description of embodiments, detailed description of well-known related structures or functions may be omitted when it is deemed that such description will cause ambiguous interpretation of the present disclosure.

In the description of the components, terms such as first, second, A, B, (a), (b) or the like may be used herein when describing components of the present disclosure. These terms are used simply for the purpose of discriminating one element from another element, and the nature, the sequences, or the orders of the elements are not limited by the terms. When one element is described as being "connected", "coupled", or "attached" to another element, it should be understood that one element may be connected or attached directly to another element, and an intervening element can also be "connected", "coupled", or "attached" to the elements.

The same name may be used to describe an element included in the embodiments described above and an element having a common function. Unless otherwise mentioned, the description of one embodiment may be applicable to other embodiments and thus, duplicated descriptions may be omitted for conciseness.

Hereinafter, detailed descriptions of an artificial intelligence (AI) agent system and method by considering a gaze of a user according to various example embodiments of the present disclosure are provided with reference to FIGS. 1 to 11.

FIG. 1 is a flowchart illustrating an example process of operating an AI agent by considering a gaze of a user in an AI agent system according to various embodiments.

Operations to be described hereinafter may be sequentially performed but not necessarily. For example, the order of the operations may change, and at least two of the operations may be performed in parallel.

Figure 9:
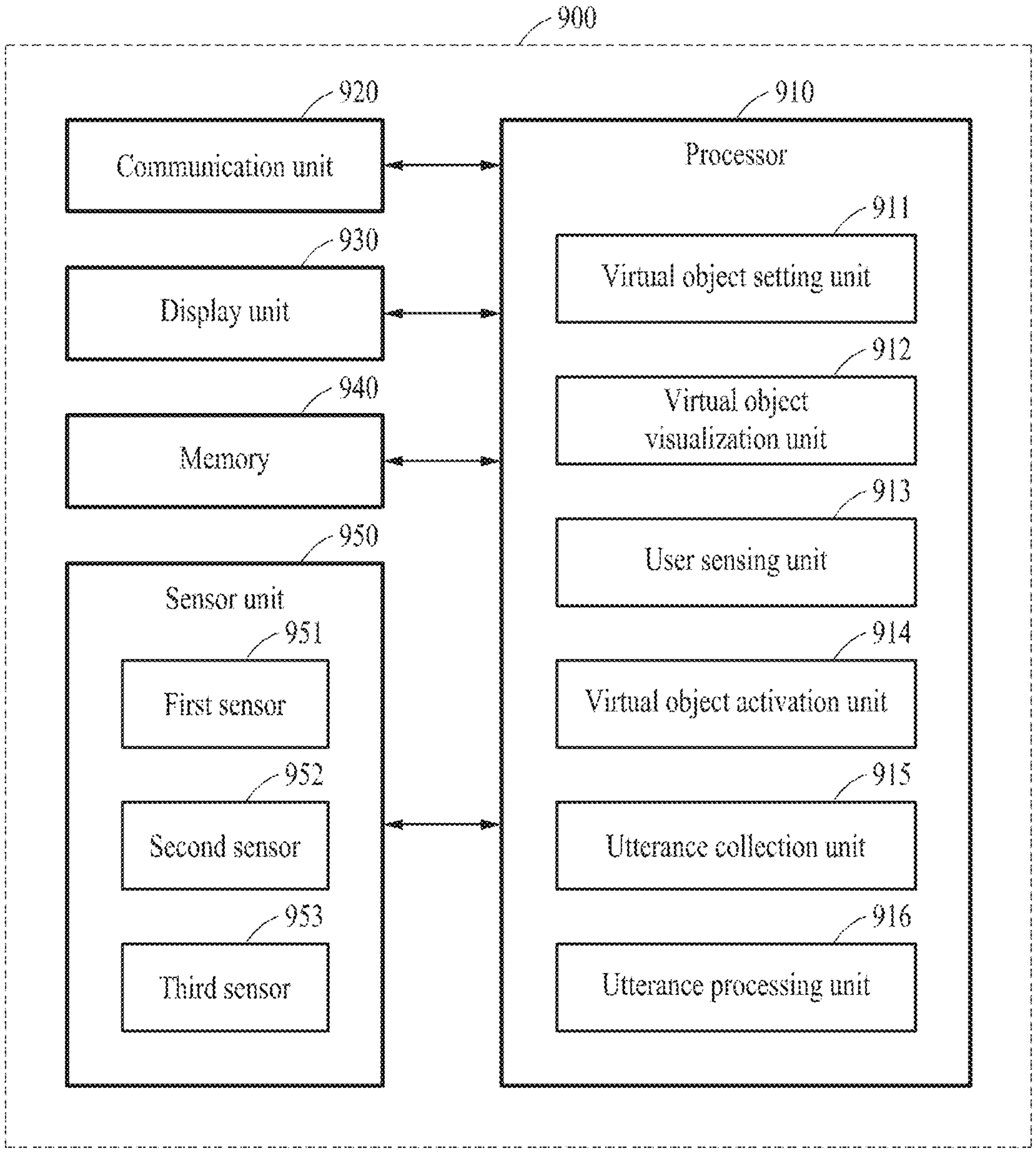
FIG. 9 is a block diagram illustrating an example configuration of an AI agent system according to various embodiments.

According to an embodiment, it may be understood that operations 110 to 150 may be performed by a processor (e.g., a processor 910 of FIG. 9) of the AI agent system (e.g., an AI agent system 900 of FIG. 9).

Referring to FIG. 1, in operation 110, the AI agent system may set a position of a virtual object. The AI agent system may set a preset (e.g., specified) area of a display to be the position of the virtual object.

In another example, the AI agent system may collect an image corresponding to a field of view (FOV) of a user through a camera, may analyze information about an area where the user is positioned using the image, and may set the position of the virtual object by considering the analyzed information about the area. For example, when an area where the user is positioned is a kitchen as a result of analyzing the user's FOV image, the AI agent system may dispose the virtual object on a kitchen countertop. In another example, when the area where the user is positioned is a living room, the AI agent system may dispose the virtual object next to a TV or a couch.

In an embodiment, the virtual object may be visualized at a determined location. The location may be a space (e.g., next to a bed, next to a couch, and next to a TV) preset by a user independently of the user's gaze or a last visualized space.

In addition, in operation 110, the AI agent system may set an FOV of the virtual object. In this case, the FOV of the virtual object may be used for interaction with the user.

In operation 120, the AI agent system may output the virtual object at a set position. In this case, the AI agent system may display where the virtual object views the user by displaying the FOV of the virtual object or an eye of the virtual object. Through this, the user may determine whether the virtual object is ready or not and may interact with the virtual object.

Figure 3:
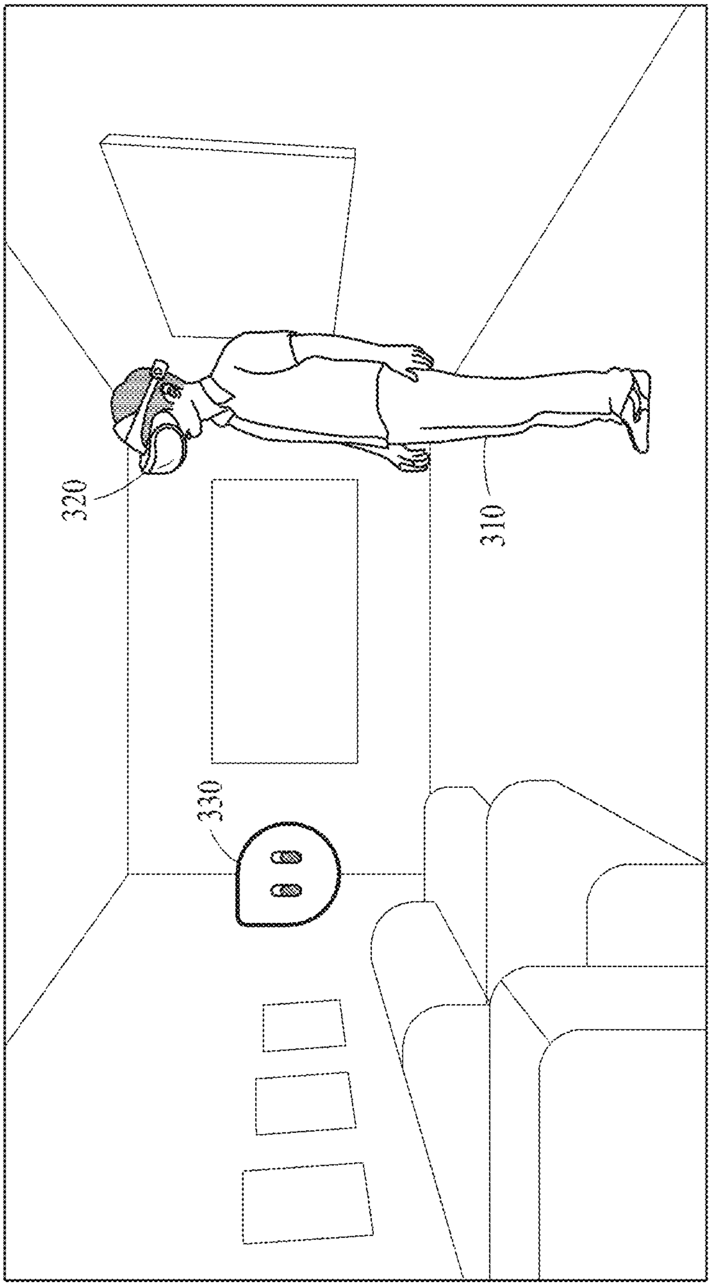
FIG. 3 is a diagram illustrating an example of using a virtual object in an AI agent system according to various embodiments.

FIG. 3 is a diagram illustrating an example of using a virtual object in an AI agent system according to various embodiments.

Referring to FIG. 3, an AI agent system 320 in the form of an extended reality (XR) device may output, to a user 310, a virtual object 330 positioned at a determined distance. When a user 320 gazes at the virtual object 330 and starts uttering without a wake word, the AI agent system 320 may be prepared to receive an utterance when the user 320 gazes at the virtual object 330.

Figure 4A:
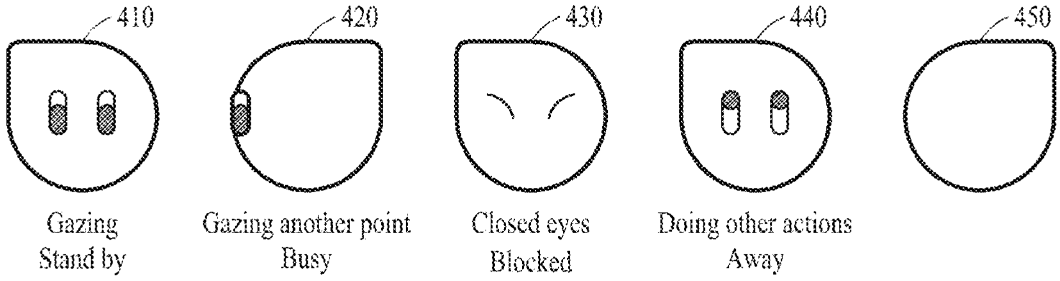
FIG. 4A is a diagram illustrating an example of displaying a state of a virtual object in an AI agent system according to various embodiments.

FIG. 4A is a diagram illustrating an example of displaying a state of a virtual object in an AI agent system according to various embodiments.

Referring to FIG. 4A, the AI agent system may display where the virtual object is oriented by displaying an eye(s) on the virtual object.

For example, the virtual object may have states, such as gazing of the user 410, gazing another point 420, closed eyes 430, doing other actions 440, turning around 450.

When the AI agent system is able to immediately receive the utterance of the user, the AI agent system may display the state of the virtual object as the gazing of the user 410, and otherwise, may display the state of the virtual object as the gazing another point 420, closed eyes 430, doing other actions 440, and turning around 450.

Meanwhile, when outputting the virtual object in operation 120, the AI agent system may output the virtual object as a preset character and may output the virtual object to act an action pattern of the preset character. For example, when the virtual object is set to be a puppy in the AI agent system, the puppy-shaped virtual object may move along the user as the user moves and may sit or lie down by moving to a set position according to a position of the user that the user stays for a predetermined time. In another example, when the virtual object is set to be a parrot, the parrot-shaped virtual object may fly and move around the user as the user moves and may sit on a high place (e.g., on a TV, on a clock, and in a living room) by moving to a set position based on a position of the user that the user stays for a predetermined time. The shape of the virtual object is not limited to an animal and may be set to be a character or a hero from a movie or animation and may also be set to mimic a unique action of the character.

Figure 4B:
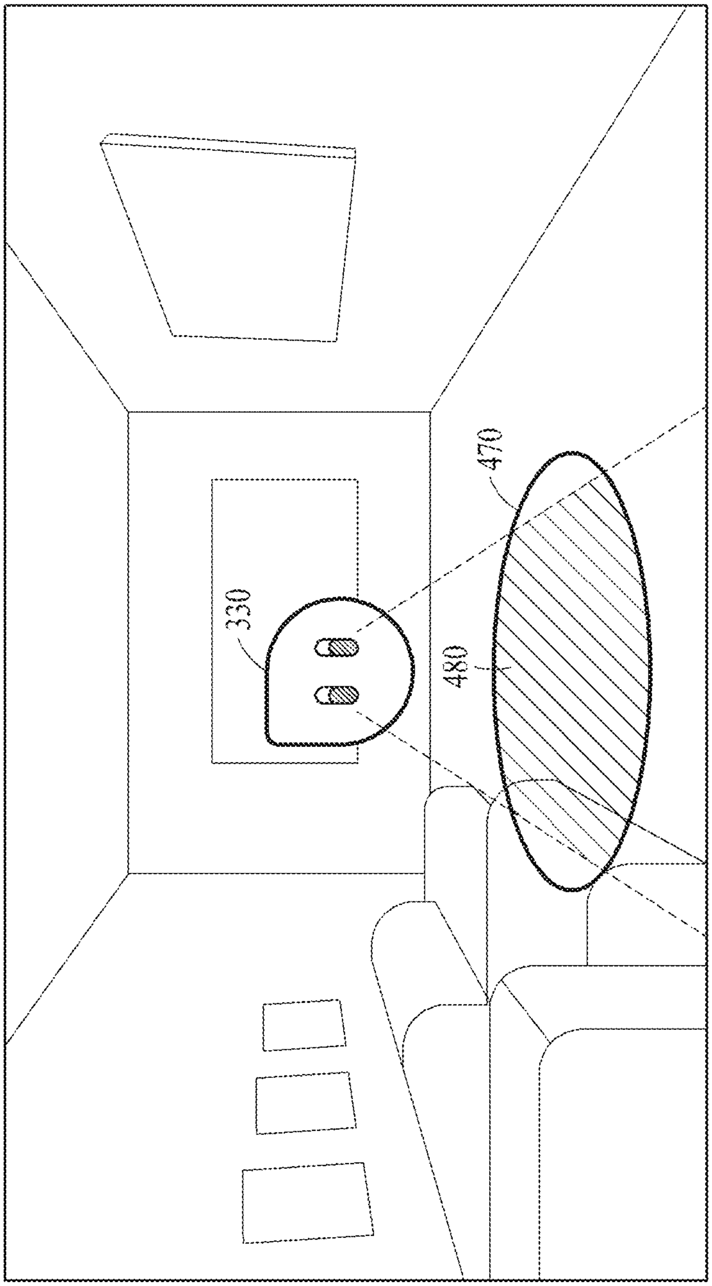
FIG. 4B is a diagram illustrating an example of displaying an area for interacting with a virtual object in an AI agent system according to various embodiments.

FIG. 4B is a diagram illustrating an example of displaying an area for interacting with a virtual object in an AI agent system according to various embodiments.

Referring to FIG. 4B, the AI agent system may display a distance 470 at which an interaction with the virtual object 330 is enabled and may display FOV information corresponding to a gaze direction of the virtual object 330.

In this case, when the virtual object 330 is set to be activated within the predetermined distance 470 of the virtual object 330 and the FOV of the virtual object 330, an activation area 480 may be displayed in a different color or shade.

Referring back to FIG. 1, in operation 130, the AI agent system may obtain gaze information of the user.

In operation 140, the AI agent system may determine whether an activation condition of the virtual object is satisfied.

In operation 140, when the user gazes at the virtual object, the AI agent system may determine that the activation condition of the virtual object is satisfied (met) by considering the gaze information of the user and the position of the virtual object.

Figure 5:
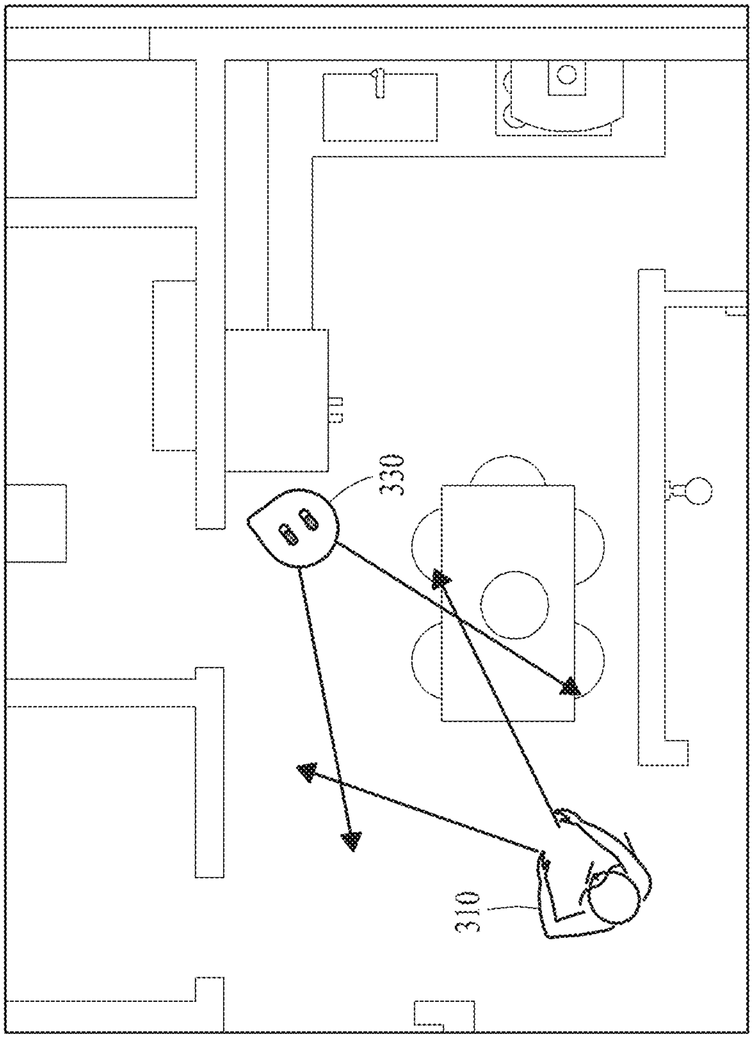
FIG. 5 is a diagram illustrating an example of a case in which a wake word is omittable in an AI agent system according to various embodiments.

In another example, when the user and the virtual object gaze (face) each other, the AI agent system may determine that the activation condition of the virtual object is satisfied (met) by considering the gaze information of the user, the position of the virtual object, and the FOV of the virtual object, as shown in the example of FIG. 5.

FIG. 5 is a diagram illustrating an example of a case in which a wake word is omittable in an AI agent system according to various embodiments.

Referring to FIG. 5, when the user 310 and the FOV of the virtual object 330 overlap and gaze (face) each other, the AI agent system may determine that the activation condition of the virtual object is satisfied (met) by considering the gaze information of the user, the position of the virtual object, and the FOV of the virtual object.

Referring back to FIG. 1, in operation 150, when the activation condition of the virtual object is satisfied as a result of determining in operation 140, the AI agent system may process an utterance of the user without a wake word. In other words, the AI agent system may identify a start time point that detects the utterance using the activation condition of the virtual object instead of the wake word.

Figure 2:
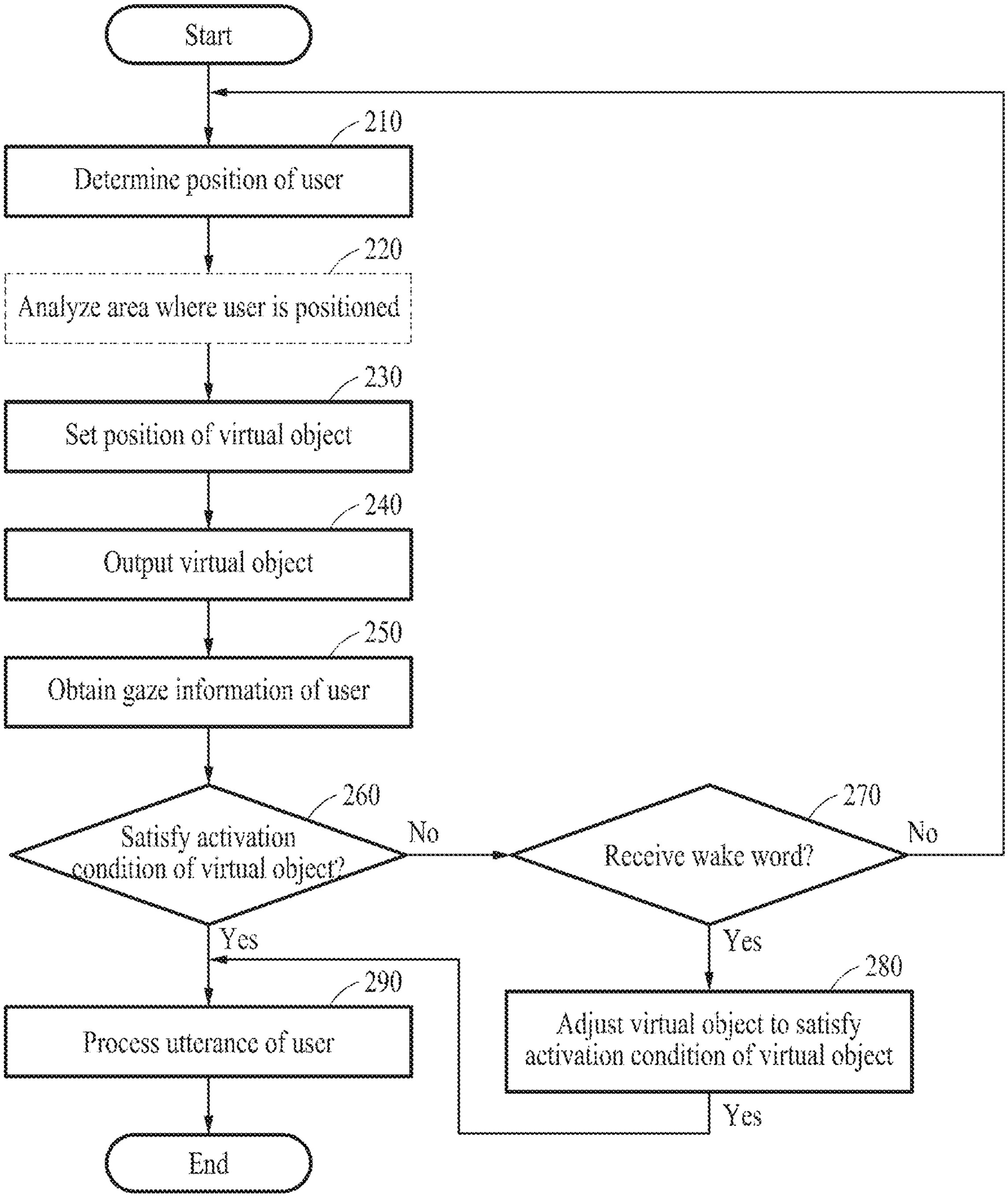
FIG. 2 is a flowchart illustrating an example process of operating an AI agent by considering a position and a gaze of a user in an AI agent system according to various embodiments.

FIG. 2 is a flowchart illustrating an example process of operating an AI agent by considering a position and a gaze of a user in an AI agent system according to various embodiments.

Operations to be described hereinafter may be sequentially performed but not necessarily. For example, the order of the operations may change, and at least two of the operations may be performed in parallel.

According to an embodiment, it may be understood that operations 210 to 290 are performed by a processor (e.g., the processor 910 of FIG. 9) of an AI agent system (e.g., the AI agent system 900 of FIG. 9).

Referring to FIG. 2, in operation 210, the AI agent system may determine a position of a user.

In operation 220, the AI agent system may collect an image corresponding to an FOV of the user through a camera and may analyze information about an area where the user is positioned using the image.

In operation 230, the AI agent system may set a position of a virtual object by considering the position of the user and the analyzed information about the area. For example, when an area where the user is positioned is a kitchen as a result of analyzing the user's FOV image, the AI agent system may dispose the virtual object on a kitchen countertop at a position apart by a predetermined distance from the user. In another example, when the area where the user is positioned is a living room and the user sits on a couch, the AI agent system may dispose the virtual object next to a TV apart by a predetermined distance from the couch, or next to the couch.

Figure 7:
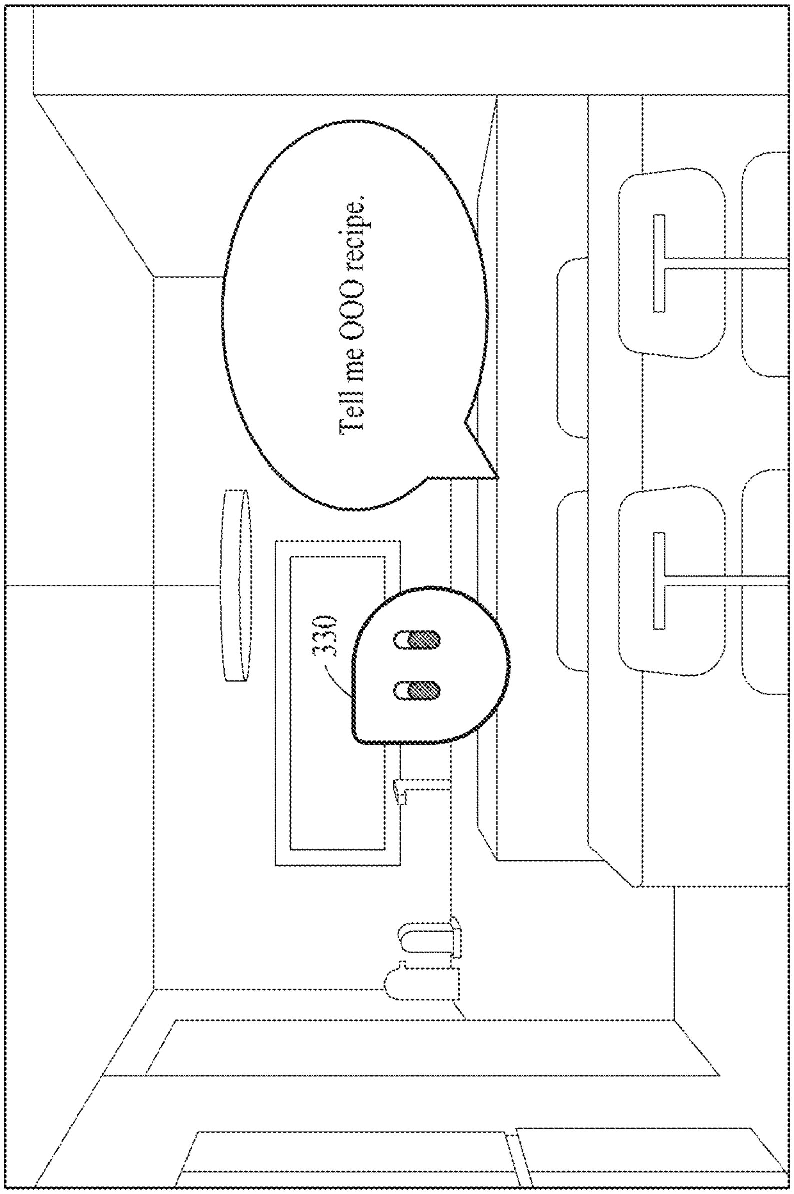
FIG. 7 is a diagram illustrating an example of setting a position of a virtual object by analyzing an area where a user is positioned in an AI agent system according to various embodiments.

FIG. 7 is a diagram illustrating an example of setting a position of a virtual object by analyzing an area where a user is positioned in an AI agent system according to various embodiments.

Referring to FIG. 7, the AI agent system may identify a gas stove, a kitchen utensil, a refrigerator, a sink, and a faucet by analyzing an FOV image of the user and when the AI agent system detects that the area where the user is positioned is a kitchen, the AI agent system may dispose the virtual object 330 on a kitchen countertop.

Operation 220 may be an optional operation and may be omitted and when operation 220 is omitted, the AI agent system may determine the position of the user in operation 210 and referring to FIG. 2, in operation 230, may set the virtual object to be positioned within a predetermined distance from the position of the user.

In addition, in operation 210, the AI agent system may set an FOV of the virtual object. In this case, the FOV of the virtual object may be used for interaction with the user.

Referring back to FIG. 2, in operation 240, the AI agent system may output the virtual object at a set position. In this case, the AI agent system may display where the virtual object views the user by displaying the FOV of the virtual object or an eye of the virtual object. Through this, the user may determine whether the virtual object is ready or not and may interact with the virtual object.

When outputting the virtual object in operation 240, the AI agent system may output the virtual object as a preset character and may output the virtual object to act an action pattern of the preset character.

In operation 250, the AI agent system may obtain gaze information of the user.

In operation 260, the AI agent system may determine whether an activation condition of the virtual object is satisfied.

In operation 260, when the user is within a preset distance of the virtual object and the user gazes at the virtual object, the AI agent system may determine that the activation condition of the virtual object is satisfied by considering the position of the user, the gaze information of the user, and the position of the virtual object.

In another example, when the user is within a preset distance of the virtual object and the user and the virtual object gaze (face) each other, the AI agent system may also determine that the activation condition of the virtual object is satisfied by considering the position of the user, the gaze information of the user, the position of the virtual object, and the FOV of the virtual object.

Figure 6:
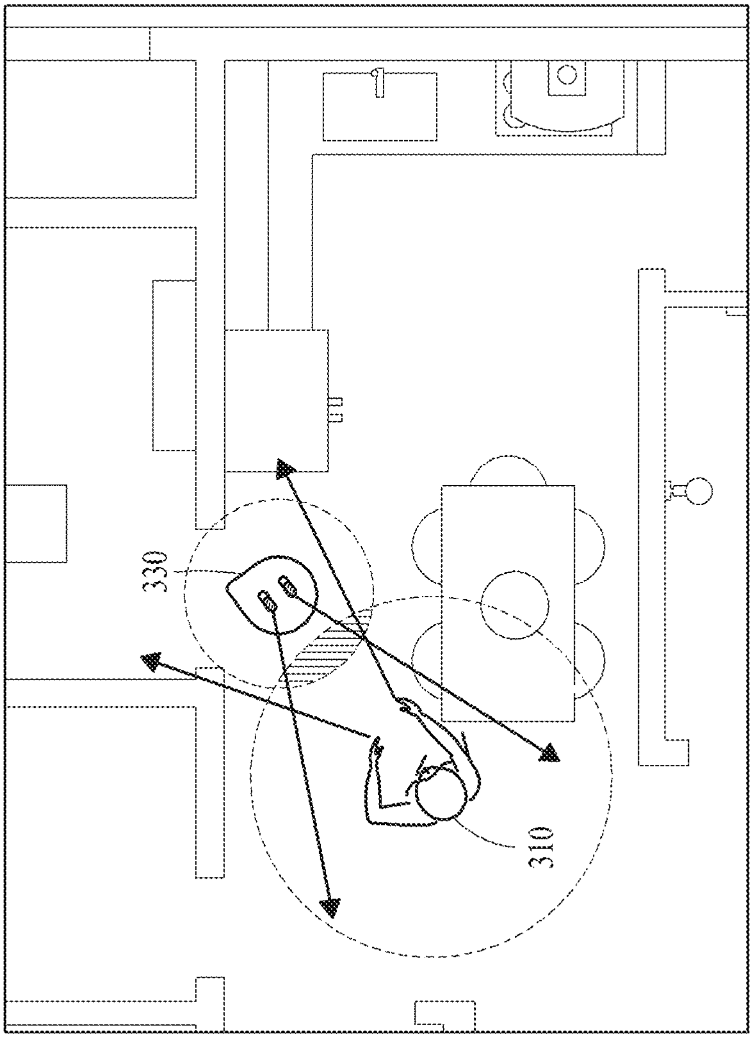
FIG. 6 is a diagram illustrating an example of a case in which a wake word is omittable in an AI agent system according to various embodiments.

FIG. 6 is a diagram illustrating an example of a case in which a wake word is omittable in an AI agent system according to various embodiments.

Referring to FIG. 6, when a radius of the user 310 and a radius of the virtual object 330 overlap each other, the existence of the user 310 and the virtual object 330 within a preset distance is determined, and the user 310 and the virtual object 330 gaze (face) each other as gazes of the user 310 and the virtual object 330 overlap each other, the AI agent system may determine that the activation condition of the virtual object is satisfied.

Referring back to FIG. 2, in operation 290, when the activation condition of the virtual object is satisfied as a result of determining in operation 250, the AI agent system may process an utterance of the user without a wake word. In other words, the AI agent system may identify a start time point that detects the utterance using the activation condition of the virtual object instead of the wake word.

In operation 270, when the activation condition of the virtual object is not satisfied as a result of determining in operation 260, the AI agent system may identify whether the wake word is received.

When the wake word is received as a result of identifying in operation 270, the AI agent system may adjust the virtual object to satisfy with the activation condition in operation 280 and may proceed to operation 290.

For example, when the virtual object is disposed far from the user or does not gaze at the user in operation 280, the AI agent system may move the virtual object to be disposed at a predetermined distance from the position of the user and may adjust the virtual object to gaze at the user.

When the wake word is not received as a result of identifying in operation 270, the AI agent system may return to operation 210 and may iteratively perform a series of operations.

Operations 270 and 280 of FIG. 2 are optional operations and may be omitted.

On the other hand, the AI agent system may be used in an environment with a plurality of users.

Figure 8:
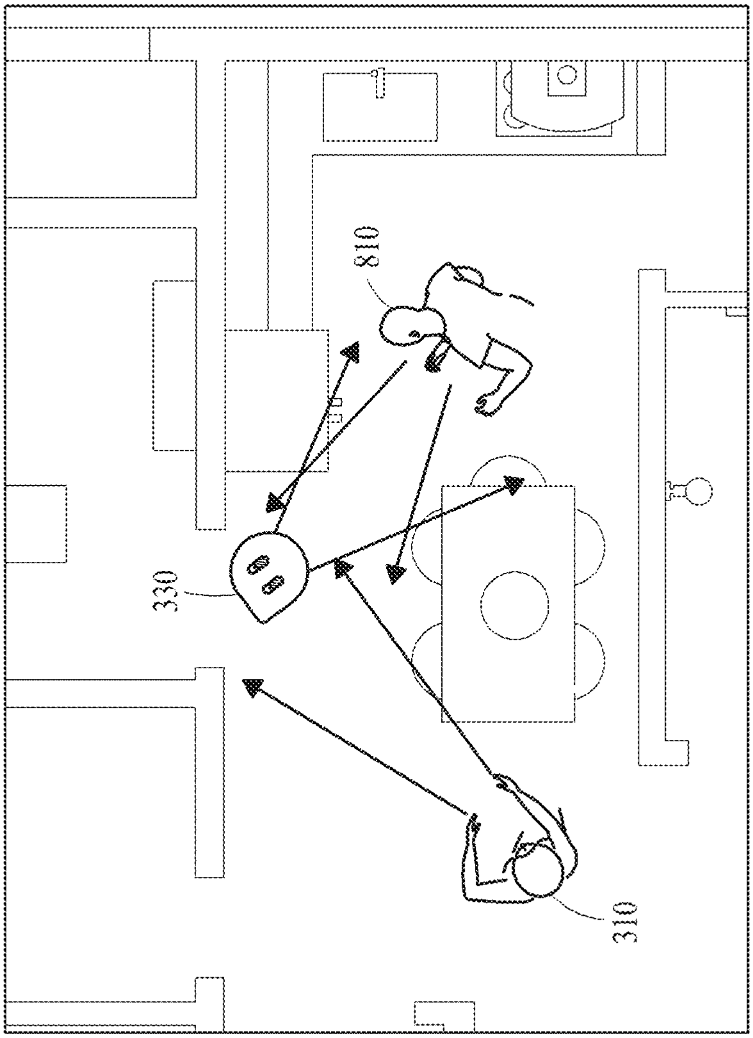
FIG. 8 is a diagram illustrating an example of a case in which a plurality of users is targeted in an AI agent system according to various embodiments.

FIG. 8 is a diagram illustrating an example of a case in which a plurality of users is targeted in an AI agent system according to various embodiments.

Referring to FIG. 8, while the virtual object 330 receives an utterance from a second user 810 and performs an interaction to process the utterance, the AI agent system may cause the virtual object 330 to gaze at the second user 810 to inform the first user 310, who is a different user from the second user 810, that the virtual object 330 is busy.

The first user 310 may inform the AI agent system that a subsequent user is in queue by waiting until the virtual object 330 does not gaze at the second user 810, the virtual object 330 gazes at the first user 310, or uttering the wake word to use the AI agent.

When the AI agent system receives the wake word from the first user 310, the AI agent system may inform the first user 310 that the AI agent system is ready to process the utterance by terminating the interaction with the second user 810 and causing the virtual object 330 to gaze at the first user 310.

FIG. 9 is a block diagram illustrating an example configuration of an AI agent system according to various embodiments.

Referring to FIG. 9, an AI agent system 900 may include a processor (e.g., including processing circuitry) 910, a communication unit (e.g., including communication circuitry) 920, a display unit (e.g., including a display) 930, a memory 940, and a sensor unit (e.g., including a sensor) 950.

The communication unit 920 may include various communication circuitry and be a communication interface device including a receiver and a transmitter and may communicate with an intelligent server configured to process an uttered voice and respond with a processing result.

The display unit 930 may include a display and display state information (or an indicator), limited numbers and characters, a moving picture, and a still picture generated during the operation of the AI agent system 900. In addition, the display unit 930 may display a virtual object under control by a virtual object visualization unit 912.

The memory 940 may store an operating system, an application program, and data to be stored to control the overall operation of the AI agent system 900. In addition, the memory 940 may store setting information about the virtual object. In this case, the setting information about the virtual object may be information about a position of the virtual object, the shape of the virtual object, and an action pattern of the virtual object.

The sensor unit 950 may include a first sensor 951, a second sensor 952, and a third sensor 953.

The first sensor 951 may determine a gaze direction of a user by sensing an eye of the user. The first sensor 951 may be an infrared camera for capturing the eye of the user.

The second sensor 952 may determine a position of the user. The second sensor 952 may be a global positioning system (GPS) sensor or a device for determining a position of the user by applying triangulation to a distance between wireless fidelity (Wi-Fi) or stations.

The third sensor 953 may collect an image in a direction in which the user gazes. The third sensor 953 may be a camera.

The processor 910 may include a virtual object setting unit 911, the virtual object visualization unit 912, a user sensing unit 913, a virtual object activation unit 914, an utterance collection unit 915, and an utterance processing unit 916, each of which may include various processing circuitry and/or executable program instructions. The processor 910 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The virtual object setting unit 911 may set a position of the virtual object.

The virtual object setting unit 911 may set a preset area of the display unit 930 to be a portion of the virtual object.

The virtual object setting unit 911 may set the position of the virtual object by considering the position of the user determined by the second sensor 952. For example, the AI agent system may determine the position of the user and may set the virtual object to be disposed within a predetermined distance from the position of the user.

In another example, the virtual object setting unit 911 may collect an image corresponding to an FOV of a user through the third sensor 953, may analyze information about an area where the user is positioned using the image, and may set the position of the virtual object by considering the analyzed information about the area. For example, when an area where the user is positioned is a kitchen as a result of analyzing the user's FOV image, the AI agent system may dispose the virtual object on a kitchen countertop. In another example, when the area where the user is positioned is a living room, the AI agent system may dispose the virtual object next to a TV or a couch.

In another example, the virtual object setting unit 911 may collect an image corresponding to an FOV of a user through the third sensor 953, may analyze information about an area where the user is positioned using the image, and may set the position of the virtual object by considering the position of the user and the analyzed information about the area.

The virtual object setting unit 911 may set the virtual object in the form of a preset character and may set the virtual object to act an action pattern of the preset character. For example, when the virtual object is set to be a puppy in the AI agent system, the puppy-shaped virtual object may move along the user as the user moves and may sit or lie down by moving to a set position according to a position of the user that the user stays for a predetermined time. In another example, when the virtual object is set to be a parrot, the parrot-shaped virtual object may fly and move around the user as the user moves and may sit on a high place (e.g., on a TV, on a clock, and in a living room) by moving to a set position based on a position of the user that the user stays for a predetermined time. The shape of the virtual object is not limited to an animal and may be set to be a character or a hero from a movie or animation and may also be set to mimic a unique action of the character.

The user sensing unit 913 may obtain gaze information of the user through the first sensor 951.

The user sensing unit 913 may determine a position of the user through the second sensor 952.

The user sensing unit 913 may analyze an area where the user is positioned using the image collected through the third sensor 953.

The virtual object visualization unit 912 may output the virtual object on the display unit 930.

The virtual object visualization unit 912 may set the position of the virtual object by considering the position of the user and the analyzed information about the area.

The virtual object visualization unit 912 may set an FOV of the virtual object with the position of the virtual object and when outputting the virtual object, the virtual object visualization unit 912 may output the virtual object by displaying the FOV of the virtual object or the eye of the virtual object.

The virtual object activation unit 914 may determine whether an activation condition of the virtual object is satisfied by considering the gaze information of the user.

When the user gazes at the virtual object, the virtual object visualization unit 912 may determine that the activation condition of the virtual object is satisfied by considering the gaze information of the user and the position of the virtual object.

When the user and the virtual object gaze at each other, the virtual object visualization unit 912 may determine that the activation condition of the virtual object is satisfied by considering the gaze information of the user, the position of the virtual object, and the FOV of the virtual object.

When the user exists within a preset distance from the virtual object and the user gazes at the virtual object, the virtual object visualization unit 912 may determine that the activation condition of the virtual object is satisfied by considering the gaze information of the user, the position of the user, and the position of the virtual object.

When the user exists within a preset distance from the virtual object and the user and the virtual object gaze at each other, the virtual object visualization unit 912 may determine that the activation condition of the virtual object is satisfied by considering the gaze information of the user, the position of the virtual object, and the FOV of the virtual object.

When a wake word is input through the utterance collection unit 915 while the activation condition of the virtual object is not satisfied as a result of determining of the virtual object activation unit 914, the virtual object visualization unit 912 may adjust the virtual object to satisfy the activation condition of the virtual object. For example, when the virtual object is disposed far from the user or does not gaze at the user, the virtual object visualization unit 912 may move the virtual object to be disposed at a predetermined distance from the position of the user and may adjust the virtual object to gaze at the user.

When the activation condition of the virtual object is satisfied as a result of determining of the virtual object activation unit 914, the utterance collection unit 915 may collect the utterance of the user without the wake word.

The utterance processing unit 916 may process the utterance of the user collected by the utterance collection unit 915. For example, the utterance processing unit 916 may change the utterance to text data and may output a processing result based on the text data as a response.

The utterance processing unit 916 may be included in the AI agent system 900 but may also be implemented as an external intelligent device or may respond to the processing result through communication via the communication unit 920.

The AI agent system 900 of FIG. 9 may be configured as an electronic device 1001 in a network environment of FIG. 10 below or may be configured as wearable AR glasses 1100 shown in FIG. 11.

Figure 10:
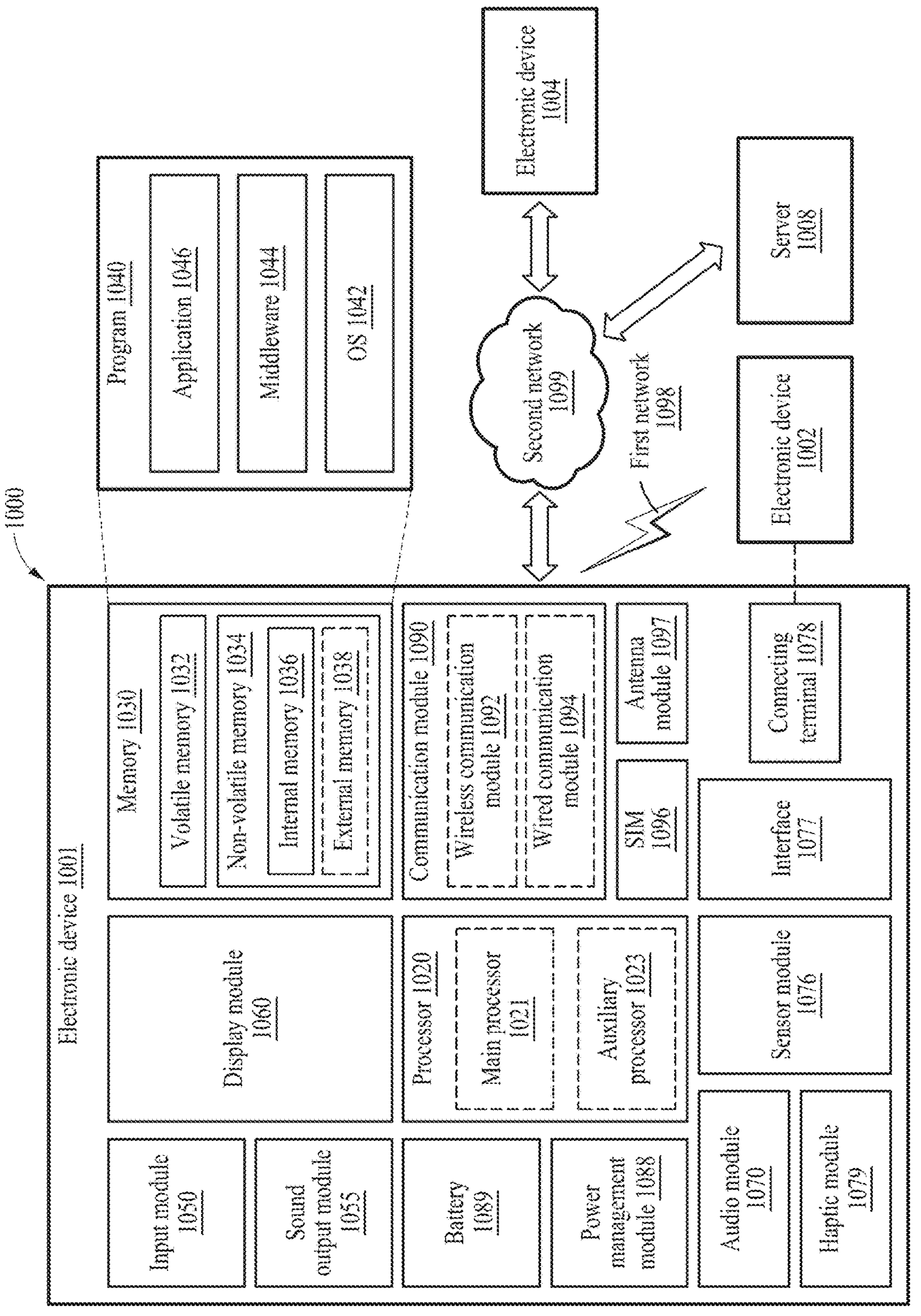
FIG. 10 is a block diagram illustrating an example electronic device in a network environment according to various embodiments.

FIG. 10 is a block diagram illustrating an example electronic device 1001 in a network environment 1000 according to various embodiments.

Referring to FIG. 10, an electronic device 1001 in a network environment 1000 may communicate with an electronic device 1002 via a first network 1098 (e.g., a short-range wireless communication network), or communicate with at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, a memory 1030, an input module 1050, a sound output module 1055, a display module 1060, an audio module 1070, and a sensor module 1076, an interface 1077, a connecting terminal 1078, a haptic module 1079, a power management module 1088, a battery 1089, a communication module 1090, a subscriber identification module (SIM) 1096, or an antenna module 1097. In various embodiments, at least one (e.g., the connecting terminal 1078) of the above components may be omitted from the electronic device 1001, or one or more other components may be added in the electronic device 1001. In various embodiments, some (e.g., the sensor module 1076, the camera module 1080, or the antenna module 1097) of the components may be integrated as a single component (e.g., the display module 1060).

The processor 1020 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner.

At least one processor may execute program instructions to achieve or perform various functions. The processor 1020 may execute, for example, software (e.g., a program 1040) to control at least one other component (e.g., a hardware or software component) of the electronic device 1001 connected to the processor 1020, and may perform various data processing or computation. According to an embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)) or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021 or to be specific to a specified function. The auxiliary processor 1023 may be implemented separately from the main processor 1021 or as a part of the main processor 1021.

The auxiliary processor 1023 may control at least some of functions or states related to at least one (e.g., the display module 1060, the sensor module 1076, or the communication module 1090) of the components of the electronic device 1001, instead of the main processor 1021 while the main processor 1021 is in an inactive (e.g., sleep) state or along with the main processor 1021 while the main processor 1021 is an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed by, for example, the electronic device 1001 in which artificial intelligence is performed, or may be performed via a separate server (e.g., the server 1008). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

Meanwhile, the processor 1020 may correspond to processor 910 of FIG. 9.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored as software in the memory 1030, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output a sound signal to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001 (e.g., a user). The display module 1060 may include, for example, a control circuit for controlling a display, a hologram device, or a projector and control circuitry to control a corresponding one of the display, the hologram device, and the projector. According to an embodiment, the display module 1060 may include a touch sensor adapted to detect a touch, or a pressure sensor adapted to measure the intensity of force incurred by the touch.

The audio module 1070 may convert a sound into an electric signal or vice versa. According to an embodiment, the audio module 1070 may obtain the sound via the input module 1050 or output the sound via the sound output module 1055 or an external electronic device (e.g., the electronic device 1002 such as a speaker or a headphone) directly or wirelessly coupled with the electronic device 1001.

The sensor module 1076 may detect an operational state (e.g., power or temperature) of the electronic device 1001 or an environmental state (e.g., a state of a user) external to the electronic device 1001, and generate an electric signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, a Hall sensor, or an illuminance sensor.

Meanwhile, the sensor module 1076 may include the sensor unit 950 including the first sensor 951, the second sensor 952, and the third sensor 953 of FIG. 9.

In addition, the sensor module 1076 may further include a camera module that may a still image and moving images. The camera module may include one or more lenses, image sensors, ISPs, or flashes.

The interface 1077 may support one or more specified protocols to be used for the electronic device 1001 to be coupled with the external electronic device (e.g., the electronic device 1002) directly (e.g., by wire) or wirelessly. According to an embodiment, the interface 1077 may include, for example, a high-definition multimedia interface (HDMI), a universal serial bus (USB) interface, a secure digital (SD) card interface, or an audio interface.

For example, the electronic device 1001 may transmit an image signal to an external electronic device through the connecting terminal 1078. The electronic device 1001 may transmit an image signal that allows the external electronic device to output an image to the display module 1060 of the external electronic device.

The connecting terminal 1078 may be used to output an image signal or a voice signal. For example, the connecting terminal 1078 may simultaneously output an image signal and a voice signal. For example, the electronic device 1001 may output an image signal and a voice signal through an interface, such as an HDMI, a DisplayPort (DP), or a Thunderbolt, in the connecting terminal 1078 that simultaneously outputs the image and the voice signal.

The connecting terminal 1078 may include a connector via which the electronic device 1001 may be physically connected to an external electronic device (e.g., the electronic device 1002). According to an embodiment, the connecting terminal 1078 may include, for example, an HDMI connector, a DP connector, a Thunderbolt connector, a USB connector, an SD card connector, or an audio connector (e.g., a headphone connector).

The haptic module 1079 may convert an electric signal into a mechanical stimulus (e.g., a vibration or a movement) or an electrical stimulus which may be recognized by a user via his or her tactile sensation or kinesthetic sensation. According to an embodiment, the haptic module 1079 may include, for example, a motor, a piezoelectric element, or an electric stimulator.

The power management module 1088 may manage power supplied to the electronic device 1001. According to an embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently of the processor 1020 (e.g., an application processor) and that support a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module, or a power line communication (PLC) module). A corresponding one of these communication modules may communicate with the external electronic device 1004 via the first network 1098 (e.g., a short-range communication network, such as Bluetooth™, Wi-Fi direct, or infrared data association (IrDA)) or the second network 1099 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the SIM 1096.

The wireless communication module 1092 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., a mmWave band) to achieve, e.g., a high data transmission rate. The wireless communication module 1092 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element including a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in a communication network, such as the first network 1098 or the second network 1099, may be selected by, for example, the communication module 1090 from the plurality of antennas. The signal or the power may be transmitted or received between the communication module 1090 and the external electronic device via the at least one selected antenna. According to an embodiment, another component (e.g., a radio frequency integrated circuit (RFIC)) other than the radiating element may be additionally formed as a part of the antenna module 1097.

According to various embodiments, the antenna module 1097 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the external electronic devices 1002 and 1004 may be a device of the same type as or a different type from the electronic device 1001. According to an embodiment, all or some of operations to be executed at the electronic device 1001 may be executed at one or more of the external electronic devices (e.g., the external devices 1002 and 1004, and the server 1008). For example, if the electronic device 1001 needs to perform a function or a service automatically, or in response to a request from a user or another device, the electronic device 1001, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In an embodiment, the external electronic device 1004 may include an Internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

Figure 11:
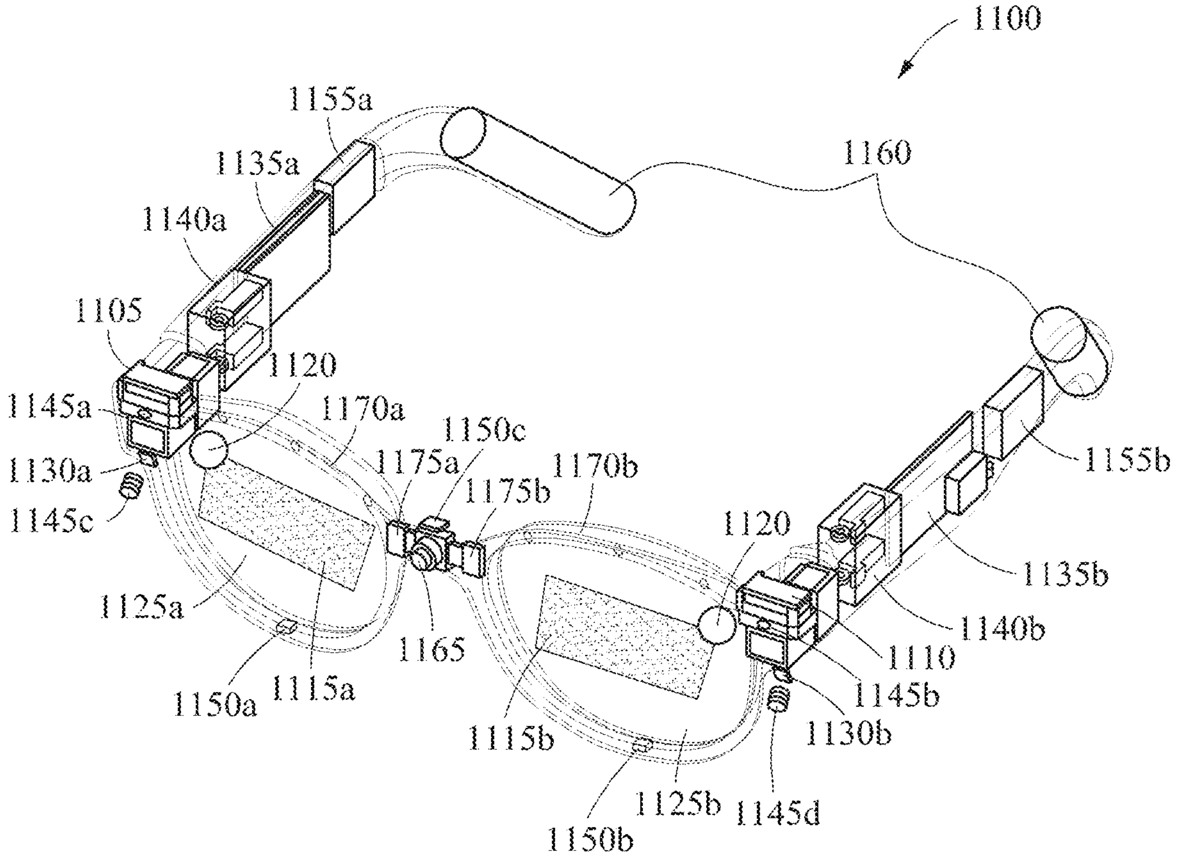
FIG. 11 is a diagram illustrating an example configuration and structure of an electronic device implemented in the form of wearable augmented reality (AR) glasses according to various embodiments.

FIG. 11 is a diagram illustrating an example configuration and structure of an electronic device implemented in the form of wearable augmented reality (AR) glasses according to various embodiments.

Referring to FIG. 11, an electronic device 1100 may be worn on a face of a user to provide an image associated with an AR service and/or a virtual reality service to the user.

In an embodiment, the electronic device 1100 may include a first display 1105, a second display 1110, screen display portions 1115*a* and 1115*b*, an input optical member 1120, a first transparent member 1125*a*, a second transparent member 1125*b*, lighting units 1130*a* and 1130*b*, a first printed circuit board (PCB) 1135*a*, a second PCB 1135*b*, a first hinge 1140*a*, a second hinge 1140*b*, first cameras 1145*a*, 1145*b*, 1145*c*, and 1145*d*, a plurality of microphones (e.g., a first microphone 1150*a*, a second microphone 1150*b*, and a third microphone 1150*c*), a plurality of speakers (e.g., a first speaker 1155*a* and a second speaker 1155*b*), a battery 1160, second cameras 1175*a* and 1175*b*, a third camera 1165, and visors 1170*a* and 1170*b*.

In an embodiment, a display (e.g., the first display 1105 and the second display 1110) may include, for example, a liquid crystal display (LCD), a digital mirror device (DMD), or a liquid crystal on silicon (LCoS), an organic light-emitting diode (OLED), a micro light-emitting diode (micro LED), or the like. Although not shown, when the display is one of an LCD, a DMD, or an LCoS, the electronic device 1100 may include a light source configured to irradiate light to a screen output region of the display. In an embodiment, when the display is capable of generating light by itself, for example, when the display is either an OLED or a micro-LED, the electronic device 1100 may provide a virtual image with a relatively high quality to the user even though a separate light source is not included. In an embodiment, when the display is implemented as an OLED or a micro LED, a light source may be unnecessary, which may lead to lightening of the electronic device 1100. Hereinafter, a display capable of generating light by itself may be referred to as a "self-luminous display", and a description will be made on the assumption of the self-luminous display.

A display (e.g., the first display 1105 and the second display 1110) according to various embodiments may include at least one micro-LED. For example, the micro-LED may express red (R), green (G), and blue (B) by emitting light by itself, and a single chip may implement a single pixel (e.g., one of R, G, and B pixels) because the micro-LED is relatively small in size (e.g., 100 μm or less). Accordingly, the display may provide a high resolution without a backlight unit (BLU), when the display includes a micro-LED.

However, the embodiments are not limited thereto. A pixel may include R, G and B, and a single chip may be implemented by a plurality of pixels including R, G, and B pixels.

In an embodiment, the display (e.g., the first display 1105 and the second display 1110) may be include a display area made up of pixels for displaying a virtual image, and light-receiving pixels (e.g., photo sensor pixels) disposed among the pixels that receive the light reflected from eyes, convert the reflected light into electrical energy, and output light.

In an embodiment, the electronic device 1100 may detect a gaze direction (e.g., a movement of a pupil) of the user through the light receiving pixels. For example, the electronic device 1100 may detect and track a gaze direction of a right eye of the user and a gaze direction of a left eye of the user through one or more light-receiving pixels of the first display 1105 and one or more light-receiving pixels of the second display 1110. The electronic device 1100 may determine a central position of a virtual image according to the gaze directions of the right eye and the left eye of the user (e.g., directions in which pupils of the right eye and the left eye of the user gaze) detected through the one or more light-receiving pixels.

In an embodiment, light emitted from the display (e.g., the first display 1105 and the second display 1110) may reach the first screen display portion 1115*a* formed on the first transparent member 1125*a* that faces the right eye of the user, and the first screen display portion 1115*b* formed on the second transparent member 1125*b* that faces the left eye of the user, by passing through a lens (not shown) and a waveguide. For example, the light emitted from the display (e.g., the first display 1105 and the second display 1110) may be reflected from a grating area formed in the input optical member 1120 and the screen display portions 1115*a* and 1115*b*, and may be transmitted to the eyes of the user by passing through the waveguide. The first transparent member 1125*a* and/or the second transparent member 1125*b* may be formed of a glass plate, a plastic plate, or a polymer, and may be transparently or translucently formed.

In an embodiment, a lens (not shown) may be disposed on a front surface of the display (e.g., the first display 1105 and the second display 1110). The lens (not shown) may include a concave lens and/or a convex lens. For example, the lens (not shown) may include a projection lens or a collimation lens.

In an embodiment, the screen display portions 1115*a* and 1115*b* or a transparent member (e.g., the first transparent member 1125*a* and the second transparent member 1125*b*) may include a lens including a waveguide and a reflective lens.

In an embodiment, the waveguide may be formed of glass, plastic, or a polymer, and may have a nanopattern formed on one surface of the inside or outside, for example, a grating structure of a polygonal or curved shape. According to an embodiment, light incident to one end of the waveguide may be propagated inside a display waveguide by the nanopattern to be provided to the user. In an embodiment, a waveguide including a free-form prism may provide incident light to the user through a reflection mirror. The waveguide may include at least one of diffractive elements (e.g., a diffractive optical element (DOE) or a holographic optical element (HOE) or at least one of a reflective elements (e.g., a reflection mirror). In an embodiment, the waveguide may guide light emitted from the first display 1105 and the second display 1110 to the eyes of the user, using at least one diffractive element or a reflective element included in the waveguide.

According to various embodiments, the diffractive element may include the input optical member 1120 and/or an output optical member (not shown). For example, the input optical member 1120 may refer to an input grating area, and the output optical member (not shown) may refer to an output grating area. The input grating area may function as an input terminal to diffract (or reflect) light output from the display (e.g., the first display 1105 and the second display 1110) (e.g., a micro light-emitting diode (LED)) to transmit the light to a transparent member (e.g., the transparent member 1125*a* and the second transparent member 1125*b*) of the screen play portions 1115*a* and 1115*b*. The output grating region may serve as an exit for diffracting (or reflecting), to the user's eyes, the light transmitted to the transparent members (e.g., the first transparent member 1125*a* and the second transparent member 1125*b*) of the waveguide.

According to an embodiment, a reflective element may include a total reflection waveguide or a total reflection optical element for total internal reflection (TIR). For example, TIR, which is one of schemes for inducing light, may form an angle of incidence such that light (e.g., a virtual image) entering through the input grating area is completely reflected from one surface (e.g., a specific surface) of the waveguide, to completely transmit the light to the output grating area.

In an embodiment, the light emitted from the displays 1105 and 1110 may be guided by the waveguide through the input optical member 1120. Light traveling in the waveguide may be guided toward the eyes of the user through the output optical member. The screen display portions 1115*a* and 1115*b* may be determined based on light emitted toward the user's eyes.

In an embodiment, the first cameras 1145*a*, 1145*b*, 1145*c*, and 1145*d* may each include a camera used for three degrees of freedom (3 DoF) and six degrees of freedom (6 DoF) head tracking, hand detection and tracking, and gesture and/or space recognition. For example, the first cameras 1145*a*, 1145*b*, 1145*c*, and 1145*d* may each include a global shutter (GS) camera to detect a movement of a head and a hand and track the movement.

For example, a stereo camera may be applied to the first cameras 1145*a*, 1145*b*, 1145*c*, and 1145*d* for head tracking and space recognition, and a camera with the same standard and performance may be applied. A GS camera having excellent performance (e.g., image dragging) may be used for the first cameras 1145*a*, 1145*b*, 1145*c*, and 1145*d* to detect a minute movement such as a quick movement of a hand or a finger and to track the movement.

According to various embodiments, a rolling shutter (RS) camera may be used for the first cameras 1145*a*, 1145*b*, 1145*c*, and 1145*d*. The first cameras 1145*a*, 1145*b*, 1145*c*, and 1145*d* may perform a SLAM function through space recognition and depth capturing for 6 DoF. The first cameras 1145*a*, 1145*b*, 1145*c*, and 1145*d* may perform a user gesture recognition function.

In an embodiment, the second cameras 1175*a* and 1175*b* may be used for detecting and tracking the pupil. The second cameras 1175*a* and 1175*b* may be referred to as a camera for eye tracking (ET). The second cameras 1175*a* and 1175*b* may track a gaze direction of the user. In consideration of the gaze direction of the user, the electronic device 1100 may position a center of a virtual image projected on the screen display portions 1115*a* and 1115*b* according to the gaze direction of the user.

A GS camera may be used for the second cameras 1175*a* and 1175*b* to detect the pupil and track a quick pupil movement. The second cameras 1175*a* and 1175*b* may be respectively installed for a left eye or a right eye, and a camera having the same performance and standard may be used for the second cameras 1175*a* and 1175*b* for the left eye and the right eye.

In an embodiment, the third camera 1165 may be referred to as a "high resolution (HR)" or a "photo video (PV)", and may include a high-resolution camera. The third camera 1165 may include a color camera having functions for obtaining a high-quality image, such as an automatic focus (AF) and an optical image stabilizer (OIS). The examples are not limited thereto, and the third camera 1165 may include a GS camera or a RS camera.

In an embodiment, at least one sensor (e.g., a gyro sensor, an acceleration sensor, a geomagnetic sensor, a touch sensor, an illuminance sensor, and/or a gesture sensor), the first cameras 1145*a*, 1145*b*, 1145*c*, and 1145*d* may perform at least one of head tracking for 6 DoF, pose estimation and prediction, gesture and/or space recognition, or a SLAM function through depth imaging.

In an embodiment, the first cameras 1145*a*, 1145*b*, 1145*c*, and 1145*d* may be classified and used as a camera for head tracking and a camera for hand tracking.

In an embodiment, the lighting units 1130*a* and 1130*b* may be used differently according to positions in which the light units 230*a* and 230*b* are attached. For example, the lighting units 1130*a* and 1130*b* may be attached together with the first cameras 1145*a*, 1145*b*, 1145*c*, and 1145*d* mounted around a hinge (e.g., the first hinge 1140*a* and the second hinge 1140*b*) that connects a frame and a temple or around a bridge that connects the frame. If capturing is performed using a GS camera, the lighting units 1130*a* and 1130*b* may be used to supplement a surrounding brightness. For example, the lighting units 1130*a* and 1130*b* may be used in a dark environment or when it is not easy to detect a subject to be captured due to reflected light and mixing of various light sources.

In an embodiment, a PCB (e.g., the first PCB 1135*a* and the second PCB 1135*b*) may include a processor (not shown), a memory (not shown), and a communication module (not shown) that control components of the electronic device 1100.

The communication module (not shown) may support establishing a direct (e.g., wired) communication channel or wireless communication channel between the electronic device 1100 and an external electronic device and performing communication through the established communication channel. The PCB may transmit electrical signals to the components of the electronic device 1100.

The communication module (not shown) may include one or more communication processors that are operable independently of the processor and that support a direct (e.g., wired) communication or a wireless communication. According to an embodiment, the communication module (not shown) may include a wireless communication module (e.g., a cellular communication module, a short-range wireless communication module, or a global navigation satellite system (GNSS) communication module) or a wired communication module (e.g., a local area network (LAN) communication module, or a power line communication (PLC) module). A corresponding one (not shown) of these communication modules may communicate with the external electronic device via a short-range communication network (e.g., Bluetooth™, wireless-fidelity (Wi-Fi) direct, or infrared data association (IrDA)) or a long-range communication network (e.g., a legacy cellular network, a 5th generation (5G) network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other.

The wireless communication module may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module may support a high-frequency band (e.g., a mmWave band) to achieve, e.g., a high data transmission rate. The wireless communication module may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna.

The electronic device 1100 may further include an antenna module (not shown). The antenna module may transmit or receive a signal or power to or from the outside (e.g., the external electronic device) of the electronic device 1100. According to an embodiment, the antenna module may include an antenna including a radiating element including a conductive material or a conductive pattern formed in or on a substrate (e.g., the first PCB 1135*a* and the second PCB 1135*b*). According to an embodiment, the antenna module may include a plurality of antennas (e.g., array antennas).

In an embodiment, a plurality of microphones (e.g., the first microphone 1150*a*, the second microphone 1150*b*, and the third microphone 1150*c*) may process an external acoustic signal into electrical audio data. The electrical audio data may be variously utilized according to a function (or an application being executed) being performed by the electronic device 1100. In an embodiment, the plurality of speakers (e.g., the first speaker 1155*a* and the second speaker 1155*b*) may output audio data received from the communication module or stored in the memory.

In an embodiment, one or more batteries 1160 may be included, and may supply power to components constituting the electronic device 1100.

In an embodiment, the visors 1170*a* and 1170*b* may adjust a transmittance amount of external light incident on the user's eyes according to a transmittance. The visors 1170*a* and 1170*b* may be positioned in front or behind the screen display portions 1115*a* and 1115*b*. The front side of the screen display portions 1115*a* and 1115*b* may refer to a direction opposite to the user wearing the electronic device 1100, and the rear side may refer to a direction of the user wearing the electronic device 1100. The visors 1170*a* and 1170*b* may protect the screen display portions 1115*a* and 1115*b* and adjust the transmittance amount of external light.

For example, the visors 1170*a* and 1170*b* may include an electrochromic element that changes color according to applied power to adjust a transmittance. Electrochromism is a phenomenon in which an applied power triggers an oxidation-reduction reaction which causes a change in color. The visors 1170*a* and 1170*b* may adjust a transmittance of external light, using the color changing properties of the electrochromic element.

For example, the visors 1170*a* and 1170*b* may include a control module and the electrochromic element. The control module may control the electrochromic element to adjust a transmittance of the electrochromic element.

According to an example embodiment, a method of operating an AI agent considering a gaze may include: setting a position of a virtual object, outputting the virtual object, obtaining gaze information of a user, determining whether an activation condition of the virtual object is satisfied by considering the gaze information of the user, and based on the activation condition of the virtual object being satisfied as a result of determination, processing an utterance of the user without a wake word.

According to an example embodiment, the determining of whether the activation condition of the virtual object is satisfied by considering the gaze information of the user may include: determining that the activation condition of the virtual object is satisfied based on the user gazing at the virtual object by considering the gaze information of the user and the position of the virtual object.

According to an example embodiment, the method may further include determining a position of the user, wherein the setting of the position of the virtual object may include setting the position of the virtual object by considering the position of the user.

According to an example embodiment, the method may further include: determining a position of the user, and analyzing an area where the user is positioned using an image input by a camera, wherein the setting of the position of the virtual object may include setting the position of the virtual object by considering the position of the user and information about the analyzed area.

According to an example embodiment, the method may further include: determining a position of the user, wherein the determining whether the activation condition of the virtual object is satisfied by considering the gaze information of the user may include determining that the activation condition of the virtual object is satisfied based on the user being within a specified distance from the virtual object and the user gazing at the virtual object by considering the gaze information of the user, the position of the user, and the position of the virtual object.

According to an example embodiment, the setting of the position of the virtual object further may include: setting an FOV of the virtual object with the position of the virtual object, the outputting of the virtual object may include: based on outputting the virtual object, outputting the virtual object by displaying the FOV of the virtual object or an eye of the virtual object, and the determining whether the activation condition of the virtual object is satisfied by considering the gaze information of the user may include: determining that the activation condition of the virtual object is satisfied based on the user and the virtual object gazing at each other by considering the gaze information of the user, the position of the virtual object, and the FOV of the virtual object.

According to an example embodiment, the method may further include: determining a position of the user, wherein the setting of the position of the virtual object further may include setting the FOV of the virtual object with the position of the virtual object, the outputting of the virtual object may include, based on outputting the virtual object, outputting the virtual object by displaying the FOV of the virtual object or an eye of the virtual object, and the determining whether the activation condition of the virtual object is satisfied by considering the gaze information of the user may include determining that the activation condition of the virtual object is satisfied based on the user being within a specified distance from the virtual object and the user and the virtual object gazing at each other by considering the gaze information of the user, the position of the virtual object, and the FOV of the virtual object.

According to an example embodiment, the method may further include, based on a wake word being input while the activation condition of the virtual object is not satisfied as a result of determination, adjusting the virtual object to satisfy the activation condition of the virtual object.

According to an example embodiment, the outputting of the virtual object may include outputting the virtual object as a specified character and outputting the virtual object to act an action pattern of the specified character.

According to an example embodiment, an AI agent system considering a gaze may include: a first sensor configured to sense an eye of a user, a display unit comprising a display on which a virtual object is output, a virtual object setting unit comprising circuitry configured to set a position of the virtual object, a virtual object visualization unit comprising circuitry configured to output the virtual object on the display unit, a user sensing unit comprising circuitry configured to obtain gaze information of the user through the first sensor, a virtual object activation unit comprising circuitry configured to determine whether an activation condition of the virtual object is satisfied by considering the gaze information of the user, an utterance collection unit comprising circuitry configured to collect an utterance of the user without a wake word based on the activation condition of the virtual object being satisfied as a result of determination of the virtual object activation unit, and an utterance processing unit comprising circuitry configured to process the utterance of the user collected by the utterance collection unit.

According to an example embodiment, the virtual object activation unit may be further configured to determine that the activation condition of the virtual object is satisfied based on the user gazing at the virtual object by considering the gaze information of the user and the position of the virtual object.

According to an example embodiment, the AI agent system may further include a second sensor configured to determine a position, wherein the user sensing unit may be further configured to determine the position of the user through the second sensor, and the virtual object setting unit may be further configured to set the position of the virtual object by considering the position of the user.

According to an example embodiment, the AI agent system may further include: the second sensor configured to determine a position, and a third sensor configured to collect an image in a direction in which the user gazes, wherein the user sensing unit may be further configured to determine the position of the user through the second sensor and analyze an area where the user is positioned, and the virtual object visualization unit may be further configured to set the position of the virtual object by considering the position of the user and information about the analyzed area.

According to an example embodiment, the AI agent system may further include: the second sensor configured to determine a position, wherein the user sensing unit may be further configured to determine the position of the user through the second sensor, and the virtual object activation unit may be further configured to determine that the activation condition of the virtual object is satisfied based on the user being within a specified distance from the virtual object and the user gazing at the virtual object by considering the gaze information of the user, the position of the user, and the position of the virtual object.

According to an example embodiment, the virtual object visualization unit may be further configured to set an FOV of the virtual object with the position of the virtual object and based on outputting the virtual object, output the virtual object by displaying the FOV of the virtual object or an eye of the virtual object, and the virtual object activation unit may be further configured to determine that the activation condition of the virtual object is satisfied based on the user and the virtual object gazing at each other by considering the gaze information of the user, the position of the virtual object, and the FOV of the virtual object.

According to an example embodiment, the AI agent system may further include: the second sensor configured to determine a position, wherein the user sensing unit may be further configured to determine the position of the user through the second sensor, the virtual object visualization unit may be further configured to set an FOV of the virtual object with the position of the virtual object and based on outputting the virtual object, output the virtual object by displaying the FOV of the virtual object or the eye of the virtual object, and the virtual object activation unit may be further configured to determine that the activation condition of the virtual object is satisfied based on the user being within a specified distance from the virtual object and the user and the virtual object gaze at each other by considering the gaze information of the user, the position of the virtual object, and the FOV of the virtual object.

The virtual object visualization unit may be further configured to, based on the wake word being input through the utterance collection unit while the activation condition of the virtual object is not satisfied as a result of determination of the virtual object activation unit, adjust the virtual object to satisfy the activation condition of the virtual object.

The virtual object setting unit may be further configured to set the virtual object as a specified character and set the virtual object to act an action pattern of the specified character.

According to an example embodiment, an AI agent system considering a gaze may include: a first sensor configured to sense an eye of a user, a display unit comprising a display on which a virtual object is output, and at least one processor, comprising processing circuitry, individually and/or collectively, configured to: set a position of the virtual object, output the virtual object on a display unit comprising a display, obtain gaze information of a user through a first sensor, determine whether an activation condition of the virtual object is satisfied by considering the gaze information of the user, and based on the activation condition of the virtual object being satisfied as a result of determination, process an utterance of the user without a wake word.

The electronic device according to embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wired), wirelessly, or via a third element.

As used in connection with embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape, optical media such as CD-ROM discs, DVDs, and/or Blue-ray discs, magneto-optical media such as optical discs, and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or uniformly instruct or configure the processing device to operate as desired. Software and data may be stored in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of operating an artificial intelligence (AI) agent considering a gaze, the method comprising:
- setting a position of a virtual object;
- setting a field of view (FOV) of the virtual object with the position of the virtual object;
- outputting the virtual object;
- obtaining gaze information of a user;
- determining whether an activation condition of the virtual object is satisfied by considering the gaze information of the user; and
- based on the activation condition of the virtual object being satisfied as a result of determination, processing an utterance of the user without a wake word,
- wherein the determining whether the activation condition of the virtual object is satisfied by considering the gaze information of the user comprises determining that the activation condition of the virtual object is satisfied based on the user and the virtual object gazing at each other by considering the gaze information of the user, the position of the virtual object, and the FOV of the virtual object.

2. The method of one of claim 1, further comprising:
- determining a position of the user,
- wherein the setting of the position of the virtual object comprises setting the position of the virtual object by considering the position of the user.

3. The method of one of claim 1, further comprising:
- determining a position of the user; and
- analyzing an area where the user is positioned using an image input by a camera,
- wherein the setting of the position of the virtual object comprises setting the position of the virtual object by considering the position of the user and information about the analyzed area.

4. The method of one of claim 1, further comprising:
- determining a position of the user,
- wherein the determining whether the activation condition of the virtual object is satisfied by considering the gaze information of the user comprises determining that the activation condition of the virtual object is satisfied based on the user being within a specified distance from the virtual object and the user gazing at the virtual object by considering the gaze information of the user, the position of the user, and the position of the virtual object.

5. The method of one of claim 1, wherein
- the outputting of the virtual object comprises, based on outputting the virtual object, outputting the virtual object by displaying the FOV of the virtual object or an eye of the virtual object.

6. The method of one of claim 1, further comprising:
- determining a position of the user,
- the outputting of the virtual object comprises, based on outputting the virtual object, outputting the virtual object by displaying the FOV of the virtual object or an eye of the virtual object, and
- the determining whether the activation condition of the virtual object is satisfied by considering the gaze information of the user comprises determining that the activation condition of the virtual object is satisfied based on the user being within a specified distance from the virtual object and the user and the virtual object gazing at each other by considering the gaze information of the user, the position of the virtual object, and the FOV of the virtual object.

7. The method of one of claim 1, further comprising:

based on the wake word being input while the activation condition of the virtual object is not satisfied as a result of determination, adjusting the virtual object to satisfy the activation condition of the virtual object.

8. The method of claim 1, wherein the outputting of the virtual object comprises outputting the virtual object as a specified character and outputting the virtual object to act an action pattern of the specified character.

9. A non-transitory computer-readable storage medium storing instructions that, when executed by at least one processor, individually and/or collectively, cause the processor to perform the method of claim 1.

10. An artificial intelligence (AI) agent system configured to consider a gaze, the AI agent system comprising:

a first sensor configured to sense an eye of a user;

a display unit comprising a display on which a virtual object is output;

a virtual object setting unit comprising circuitry configured to set a position of the virtual object;

a virtual object visualization unit comprising circuitry configured to output the virtual object on the display unit, and set a field of view (FOV) of the virtual object with the position of the virtual object;

a user sensing unit comprising circuitry configured to obtain gaze information of the user through the first sensor;

a virtual object activation unit comprising circuitry configured to determine whether an activation condition of the virtual object is satisfied by considering the gaze information of the user, wherein the virtual object activation unit is configured to determine that the activation condition is satisfied based on the user and the virtual object gazing at each other by considering the gaze information of the user, the position of the virtual object, and the FOV of the virtual object;

an utterance collection unit comprising circuitry configured to collect an utterance of the user without a wake word based on the activation condition of the virtual object being satisfied as a result of determination of the virtual object activation unit; and an utterance processing unit comprising circuitry configured to process the utterance of the user collected by the utterance collection unit.

11. The AI agent system of claim 10, further comprising:

a second sensor configured to determine a position, wherein the user sensing unit is further configured to determine the position of the user through the second sensor, and the virtual object setting unit is further configured to set the position of the virtual object by considering the position of the user.

12. The AI agent system of claim 10, further comprising:

a second sensor configured to determine a position; and a third sensor configured to collect an image in a direction in which the user gazes, wherein the user sensing unit is further configured to determine the position of the user through the second sensor and analyze an area where the user is positioned, and the virtual object visualization unit is further configured to set the position of the virtual object by considering the position of the user and information about the analyzed area.

13. The AI agent system of claim 10, further comprising:

a second sensor configured to determine a position, wherein the user sensing unit is further configured to determine the position of the user through the second sensor, and the virtual object activation unit is further configured to determine that the activation condition of the virtual object is satisfied based on the user being within a specified distance from the virtual object and the user gazing at the virtual object by considering the gaze information of the user, the position of the user, and the position of the virtual object.

14. The AI agent system of claim 10, wherein the virtual object visualization unit is further configured to, based on outputting the virtual object, output the virtual object by displaying the FOV of the virtual object or an eye of the virtual object.

15. The AI agent system of claim 10, further comprising:

a second sensor configured to determine a position, wherein the user sensing unit is further configured to determine the position of the user through the second sensor, the virtual object visualization unit is further configured to set an FOV of the virtual object with the position of the virtual object and based on outputting the virtual object, output the virtual object by displaying the FOV of the virtual object or the eye of the virtual object, and the virtual object activation unit is further configured to determine that the activation condition of the virtual object is satisfied based on the user being within a specified distance from the virtual object and the user and the virtual object gaze at each other by considering the gaze information of the user, the position of the virtual object, and the FOV of the virtual object.

16. The AI agent system of claim 10, wherein the virtual object visualization unit is further configured to, based on the wake word being input through the utterance collection unit while the activation condition of the virtual object is not satisfied as a result of determination of the virtual object activation unit, adjust the virtual object to satisfy the activation condition of the virtual object.

17. The AI agent system of claim 10, wherein the virtual object setting unit is further configured to set the virtual object as a specified character and set the virtual object to act an action pattern of the specified character.

18. An artificial intelligence (AI) agent system configured to consider a gaze, the AI agent system comprising:

a first sensor configured to sense an eye of a user;

a display unit comprising a display on which a virtual object is output; and at least one processor, comprising processing circuitry, individually and/or collectively, configured to:

set a position of the virtual object;

set a field of view (FOV) of the virtual object with the position of the virtual object;

output the virtual object on the display unit;

obtain gaze information of the user through the first sensor;

determine whether an activation condition of the virtual object is satisfied by considering the gaze information of the user; and based on the activation condition of the virtual object being satisfied as a result of determination, process an utterance of the user without a wake word, wherein the determining whether the activation condition of the virtual object is satisfied comprises determining that the activation condition of the virtual object is satisfied based on the user and the virtual object gazing at each other by considering the gaze information of the user, the position of the virtual object, and the FOV of the virtual object.

* * * * *